July 5, 1938.        M. REIFFENSTEIN        2,123,120
TURBO MACHINE
Filed Oct. 24, 1936        2 Sheets-Sheet 1
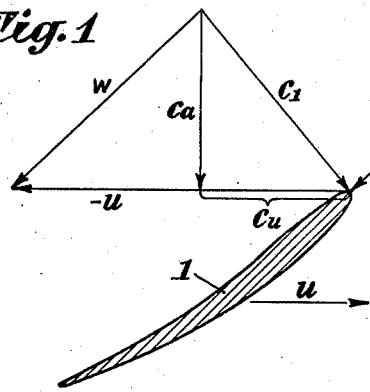
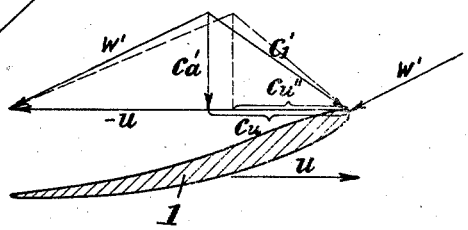
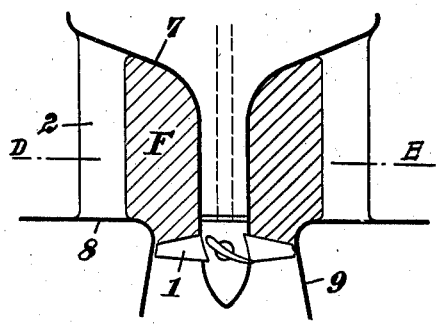
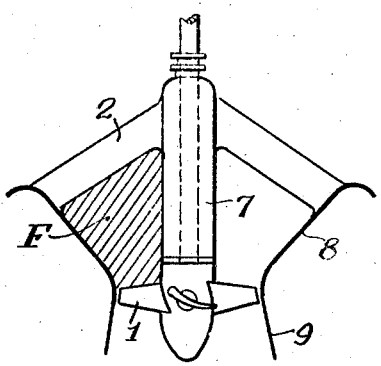
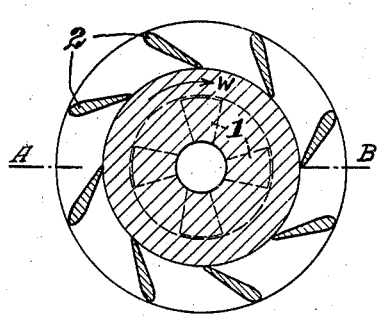
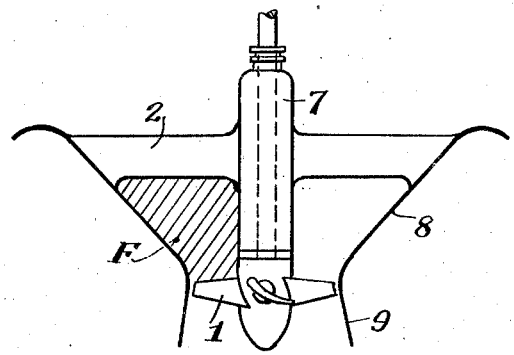
M. Reiffenstein
INVENTOR
By: Glascock Downing & Seebold
ATTYS.

UNITED STATES PATENT OFFICE 2,123,120

TURBO MACHINE

Manfred Reiffenstein, Vienna, Austria

Application October 24, 1936, Serial No. 107,471
In Austria October 26, 1935

6 Claims. (Cl. 253—148)

Water turbines of simple and inexpensive construction, controlled by different setting of the runner-blades and adapted either with fixed guide vanes or with no guide vanes at all in which case the spiral casing itself and especially its spur or baffle determines the entrance into the runner, possess as it is well known, the drawback of insufficient control performances and must therefore be provided with heavy flywheels.

This drawback is avoided according to the present invention by giving to the water the possibility to form between the fixed devices which influence the stream line directions, thus between the guide vanes or the spur or baffle, and the entrance-edges of the runner blades, a freely whirling body of water of such an extent, that it influences substantially the control characteristic of the turbine.

The principle of the present invention is shown in Figs. 1 and 2 of the drawings. Figs. 3 to 10 illustrate diagrammatically and by way of example four turbines constructed according to the present invention.

In Fig. 1, in the illustrated position of the runner blade 1 rotating in the direction $u$ at constant speed, designate $c_u$ the tangential, $c_a$ the axial and thus $c_1$ the effective velocity of the water, while $-u$ designates the tangential velocity of the runner, so that the relative velocity $w$ satisfies the condition of correct entrance, i. e. that its direction is the same as that of the first element of the blade 1.

Now, as shown in Fig. 2, if the runner blade is set flatter for a smaller discharge, the axial component is reduced instantaneously to the smaller value $c_a'$. If care is taken, that a sufficiently large body of water, which is not impeded by any guiding device and may whirl freely, is at disposal ahead of the runner, this said body of water will have the tendency to maintain the initial tangential velocity $c_u$ owing to its considerable inertia. Therefore the initial tangential velocity $c_u$ keeps invaried for some time, so that, as shown in Fig. 2, the effective velocity of the water now changes to $c_1'$ and thus the relative velocity to $w'$, the direction of which is adapted to the new position of the runner blade 1, i. e. its direction is the same as that of the first element of the blade 1. If the energy contained in the whirling body of water has been consumed also the tangential component $c_u$ takes a smaller value $c_u''$ according to the employed type of turbine, i. e. turbine with fixed guide vanes or without guide vanes.

While at normal running of the turbine, the flow conditions substantially represent those of a turbine provided with fixed distributor just in front of the runner, these conditions approach to those of a turbine with adjustable guide vanes during the period of regulation. Now it is well known that turbines with adjustable guide vanes possess a considerably better characteristic of regulation than turbines with fixed guide apparatus of common construction.

As it will be readily seen, the period, during which the true characteristic of regulation of a turbine with adjustable guide vanes changes to that of a turbine with fixed guide apparatus, must be sufficiently long, e. g. the influence of the body of water, whirling ahead of the runner, which partly counteracts onto the entering water, must be sufficiently large. As proven by numerous testings this effect is obtained positively, when the cross-section F of the whirling body of water, measured in the plane through the turbine-axis and whirling between the tail edges of the guide vanes or the baffle-edge of the spiral casing and the runner's entrance, is so large, that it exceeds the value $$\frac{Q}{\sqrt{10.g.H}}$$

whereby F designates the cross sectional area of the passage expressed in square feet, Q denotes the maximum discharge of the turbine expressed in cubic feet per second, $g$ designates the acceleration of gravitation in feet per square second and H the head in feet.

In all constructions which now will be described, the reference character F designates a vertical cross sectional area taken at any angle through the axis of the shaft.

Fig. 3 illustrates a constructional example of a turbine with fixed guide apparatus in section through the axis, the section being taken on line A—B of Fig. 4. Fig. 4 is a vertical cross section through line D—E of Fig. 3. The guide vanes 2 are distanced from the runner blades 1 by the inner wall 7 and the outer wall 8 in such a manner, that the annular cross-section F formed by the inner edges of the guide vanes 2 and the entrance edges of the runner blades 1 is greater than the value $$\frac{Q}{\sqrt{10.g.H}}$$

The draft tube 9 surrounds the runner and serves for discharging the water.

In this case the necessary value of the cross-section F has been obtained essentially by making the guide vanes 2 sufficiently high.

Fig. 5 is a section through the axis of a turbine with fixed conical distributor according to the present invention. In this construction, the necessary cross-section F is obtained by distancing the guide vanes 2 from the runner 1 as well as by suitably increasing the height of the guide vanes.

Fig. 6 is a section through the axis of a turbine with fixed axial distributor.

Figure 7:
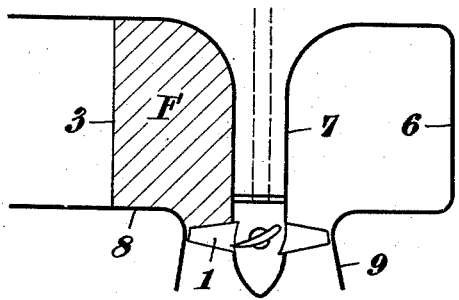
Figure 9:
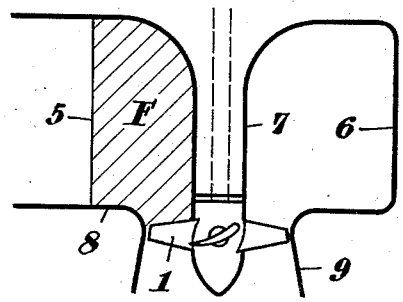
Figure 8:
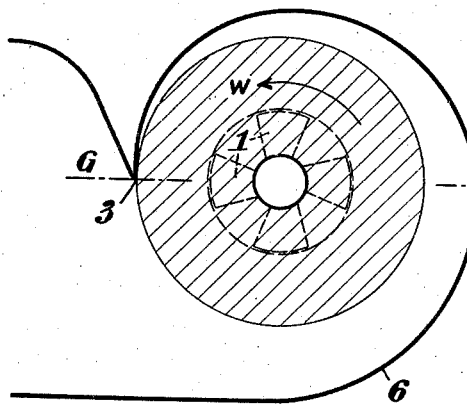
Figure 10:
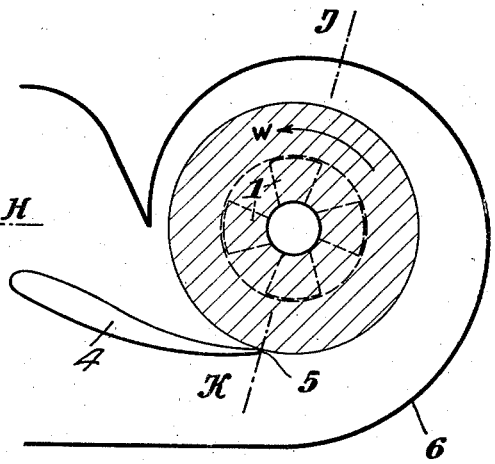

Fig. 7 illustrates a turbine without distributor but with spiral casing in section through the axis the section being taken on line G—H of Fig. 8. Fig. 8 is a vertical cross section through the axis of the shaft of the turbine shown in Fig. 7. In this case, the cross-section F of the freely whirling body of water is bounded by the baffle-edge 3 of the spiral casing 6, by the inner wall 7, the outer wall 8, and the runner's entrance edge, so that the cross-sectional area F is to be measured between this baffle-edge 3 and the entrance edge of the runner 1. Figs. 9 and 10 illustrate a turbine of modified construction in section through the axis, the section of Fig. 9 being taken on line J—K of Fig. 10, while Fig. 10 is a vertical cross section through the axis of the shaft of the turbine shown in Fig. 9. In this construction, fixed splitters 4 are arranged in the entrance, the tail-edge 5 of said splitters being disposed nearer to the shaft of the turbine than the baffle-edge 3, the cross-sectional area F has to be measured between the said tail-edge 5 and the entrance edge of the runner 1.

The present invention is applicable also to turbo-pumps whereby Q designates the maximum delivery and H the head.

What I claim is:—

1. In a turbo-machine, a distributor with fixed guide vanes, a shaft centrally disposed in said distributor, a runner provided with adustable runner-blades and secured to said shaft, a draft tube for discharging the water from the runner, an inner wall establishing communication between said guide vanes and said runner, and an outer wall establishing communication between said guide vanes and said draft tube, whereby the free vertical cross-sectional area between the tail-edges of said guide vanes, the runner's entrance edges and said inner and outer walls exceeds the value $$\frac{Q}{\sqrt{10.g.H}}$$

and is measured in a plane through said shaft.

2. In a turbo-machine, a cylindrical distributor with fixed guide vanes, a shaft centrally disposed in said distributor, a runner provided with adjustable runner-blades and secured to said shaft, a draft tube for discharging the water from the runner, an inner wall establishing communication between said guide vanes and said runner, and an outer wall establishing communication between said guide vanes and said draft tube, whereby the free vertical cross-sectional area between the tail-edges of said guide vanes, the runner's entrance edges and said inner and outer walls exceeds the value $$\frac{Q}{\sqrt{10.g.H}}$$

and is measured in a plane through said shaft.

3. In a turbo-machine, a conical distributor with fixed guide vanes, a shaft centrally disposed in said distributor, a runner provided with adjustable runner-blades and secured to said shaft, a draft tube for discharging the water from the runner, an inner wall establishing communication between said guide vanes and said runner, and an outer wall establishing communication between said guide vanes and said draft tube, whereby the free vertical cross-sectional area between the tail-edges of said guide vanes, the runner's entrance edges and said inner and outer walls exceeds the value $$\frac{Q}{\sqrt{10.g.H}}$$

and is measured in a plane through said shaft.

4. In a turbo-machine, an axial distributor with fixed guide vanes, a shaft centrally disposed in said distributor, a runner provided with adjustable runner-blades and secured to said shaft, a draft tube for discharging the water from the runner, an inner wall establishing communication between said guide vanes and said runner, and an outer wall establishing communication between said guide vanes and said draft tube, whereby the free vertical cross-sectional area between the tail-edges of said guide vanes, the runner's entrance edges and said inner and outer walls exceeds the value $$\frac{Q}{\sqrt{10.g.H}}$$

and is measured in a plane through said shaft.

5. In a turbo-machine, a plain spiral casing, a shaft centrally disposed in said casing, a runner provided with adjustable runner-blades and secured to said shaft, a draft tube for discharging the water from the runner, an inner wall establishing communication between said casing and said runner, and an outer wall establishing communication between said casing and said draft tube, whereby the free vertical cross-sectional area between the edge of the baffle of said casing, the runner's entrance edges and said inner and outer walls exceeds the value $$\frac{Q}{\sqrt{10.g.H}}$$

and is measured in a plane through said shaft.

6. In a turbo-machine, a plain spiral casing, a splitter in the entrance of said casing, a shaft centrally disposed in said casing, a runner provided with adjustable runner-blades and secured to said shaft, a draft tube for discharging the water from the runner, an inner wall establishing communication between said casing and said runner, and an outer wall establishing communication between said casing and said draft tube, whereby the free vertical cross-sectional area between the tail-edge of said splitter, the runner's entrance edges and said inner and outer walls exceeds the value $$\frac{Q}{\sqrt{10.g.H}}$$

and is measured in a plane through said shaft.

MANFRED REIFFENSTEIN.